April 7, 1931.  C. W. WEISS  1,799,661
UNIVERSAL JOINT
Filed Nov. 14, 1928
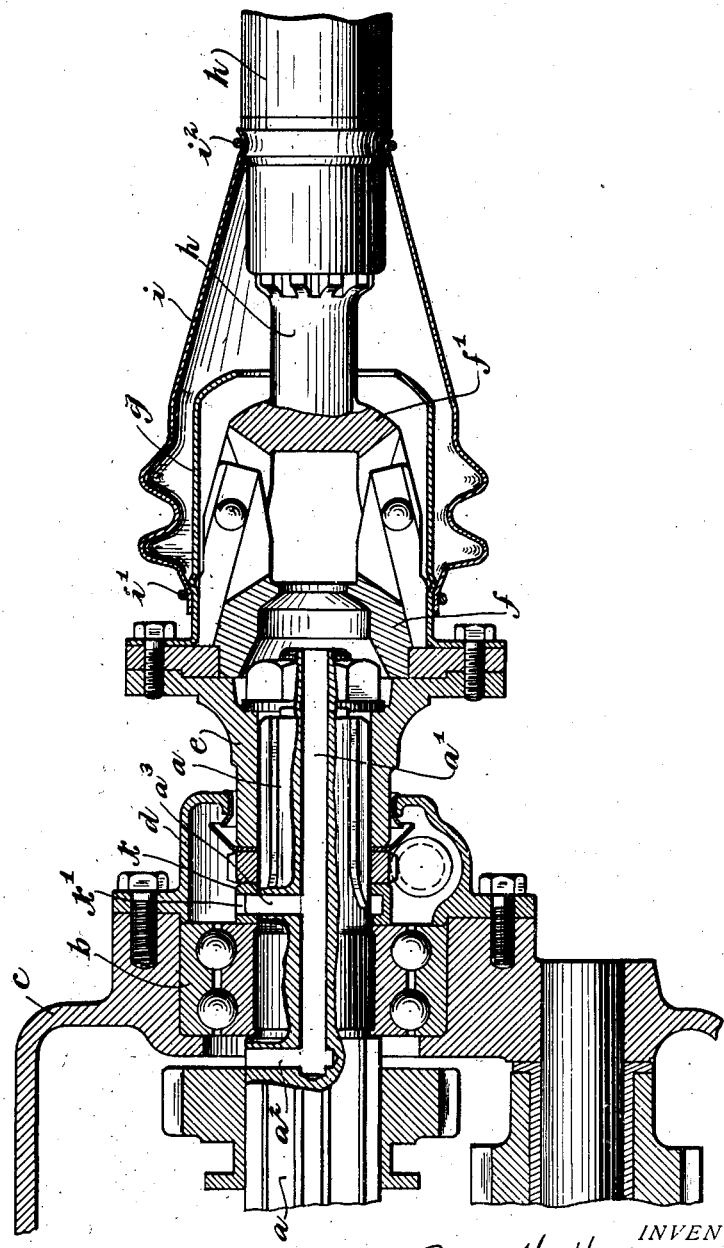
INVENTOR
Carl W. Weiss
BY
Redding, Greeley, O'Shea & Campbell
ATTORNEYS

Patented Apr. 7, 1931

1,799,661

UNITED STATES PATENT OFFICE

CARL W. WEISS, OF NEW YORK, N. Y.

UNIVERSAL JOINT

Application filed November 14, 1928. Serial No. 319,340.

In some uses of universal joints, as in their application to the ends of a propeller shaft by which motion is transmitted from the transmission shaft of a motor to the differential gearing, in an automobile, there is, by reason of the relative change of position of the two ends of the propeller shaft and a consequent change of distance between the transmission shaft and the differential, some endwise movement of the propeller shaft with respect to the transmission shaft and the differential. Such endwise movement is accommodated by such construction of the members of the universal joints, at each end of the propeller shaft, as will permit the endwise movement. As a result of such endwise movement there is frequent change of volume within the oil tight housing or booth intended to prevent the dripping of lubricant from the joint and a consequent pumping action which tends to force the lubricant from the housing or boot, which is secured about the universal joint and about the propeller shaft, with consequent dripping and ultimate loss of the lubricant necessary to the proper operation of the joint.

The object of this invention is to overcome this known difficulty and in accordance with the invention the transmission shaft with which the propeller shaft or the like is coupled by the universal joint is formed with a conduit which establishes communication between the space within the housing of the universal joint and the boot, which is charged with lubricant, and the space within the housing about such transmission shaft so that the lubricant, when the volume of the space within the housing about the joint and within the boot is reduced by the relative longitudinal movement of the propeller shaft or its like toward the cooperating shaft, the lubricant which is so displaced shall find its way into or toward the larger space within the housing about the transmission shaft and in the continued operation of the joint shall move to and fro under the influence of the pumping action and shall not be forced out at the end or ends of the flexible boot.

The invention will be more fully explained
hereinafter with reference to the accompany-
ing drawing the single figure of which illustrates in longitudinal, sectional elevation so much of a propeller shaft and its cooperating shaft, with their accessories, as is necessary to enable the invention to be understood.

In the structure which has been chosen for illustration of an embodiment of the invention there is shown at $a$ a portion of a transmission shaft which is supported by a suitable bearing at $b$ within a housing $c$ which has secured to it a supplemental housing $d$. There is shown as keyed upon the shaft $a$ a sleeve $e$ which carries one member $f$ of the universal joint, which may be of any approved construction, together with a usual housing $g$. The other member $f^1$ of the universal joint is shown as formed upon or secured to one end of a shaft $h$ which, in the construction shown, may be taken as a propeller shaft of an automobile and is imperforate, at least as to the portion which carries the joint member. Secured to the universal joint housing $g$ and the shaft, in the construction shown, is an oil tight flexible housing or boot $i$ which may be tightly secured as by wires at $i^1$ and $i^2$ to the universal joint housing and the casing of the propeller shaft.

In the operation of the structure thus far described it is obvious that in the relative displacement of the two ends of the propeller shaft, due to chassis spring movement, there must be movement of the propeller shaft toward and from the transmission shaft, whether at the one end or the other, with consequent change of volume of the space within the boot and a tendency to displace the lubricant within the boot, and force it out from the boot at the ends thereof when the volume of that space is reduced. Such lubricant as might be thus forced out would be lost with a consequent reduction of the quantity of lubricant within the boot. By the present invention the lubricant which otherwise would be displaced and lost is forced into an unobstructed passage or oil hole $a^1$ which may be drilled into the shaft $a$ longitudinally from its end, terminating within the housing of the transmission shaft, where the volume of air is such as to permit the reception or movement of the lubricant without material increase of pressure when the space within the boot $i$ is reduced. In the construction shown the oil hole or conduit $a^1$ communicates at its extreme end with a hole $a^2$ which terminates within the main housing $c$, while at $a^3$ is shown an oil hole or conduit which communicates with an internally grooved, loose collar $k$ which surrounds the shaft and has an opening $k^1$ which communicates with the space within the supplemental housing $d$.

By this construction there is afforded opportunity for the to and fro movement of the lubricant as the volume of the space within the boot $i$ is changed, the lubricant passing from such space as it is reduced in volume, without being forced out at either end of the boot, and returning to such space as its volume is increased. Dripping and loss of the lubricant are thus avoided.

It will be understood that changes in details of construction will be made to suit different conditions of use.

I claim as my invention:

The combination of a universal joint, an imperforate propeller shaft secured to one of the joint members, a transmission shaft secured to the other of the joint members and having therein a longitudinal, unobstructed passage, a housing about the transmission shaft, an oil tight housing about the universal joint, one of said shafts having capacity for relatively longitudinal movement, and the passage in the transmission shaft communicating at one end with the space within the housing of the transmission shaft and at the other end with the space within the housing about the universal joint, whereby lubricant may have a to-and-fro movement through said unobstructed passage to and from the spaces within the housings and is not permitted to accumulate in one of such spaces.

This specification signed this 12th day of November, A. D. 1928.

CARL W. WEISS.